United States Patent [19]
Gilmore

[11] Patent Number: 6,159,362
[45] Date of Patent: Dec. 12, 2000

[54] SKIMMER VALVE

[76] Inventor: Ronald N. Gilmore, 2443 E. Dolphin Ave., Mesa, Ariz. 85204

[21] Appl. No.: 09/391,901

[22] Filed: Sep. 7, 1999

[51] Int. Cl.$^7$ .................................................. B01D 17/032
[52] U.S. Cl. .......................... 210/121; 137/398; 210/122; 210/242.1; 210/540
[58] Field of Search .................................... 137/398, 399, 137/409, 429; 210/114, 121–123, 242.1, 242.3, 776, 923, 540

[56] References Cited

U.S. PATENT DOCUMENTS

| | | | |
|---|---|---|---|
| 5,094,757 | 3/1992 | Light | 210/712 |
| 5,101,936 | 4/1992 | Paredes et al. | 184/6.13 |
| 5,104,529 | 4/1992 | Becker | 210/195.1 |
| 5,454,937 | 10/1995 | Lewandowski | 210/104 |
| 5,601,705 | 2/1997 | Glasgow | 210/104 |
| 5,693,218 | 12/1997 | Yamamoto et al. | 210/122 |
| 5,814,213 | 9/1998 | Glasgow | 210/104 |

*Primary Examiner*—Joseph W. Drodge
*Attorney, Agent, or Firm*—Randal D. Homburg

[57] ABSTRACT

The invention is a perpetual skimming device for insertion into a reservoir containing liquid at the liquid level which allows the top liquid layer to enter an outer cylinder of the device through longitudinal slots, raising a floating inner cylindrical portion, which in turn, shuts off the liquid entry once enough liquid has entered the device to raise the float to cut off the liquid intrusion. The liquid is then removed by a centrally affixed pickup tube having fluid entry ports at the bottom of the tube, located near the base of the outer cylinder. As the liquid is removed, the inner cylindrical float lowers and allows more liquid into the invention, for a perpetual cyclic skimming operation.

2 Claims, 2 Drawing Sheets

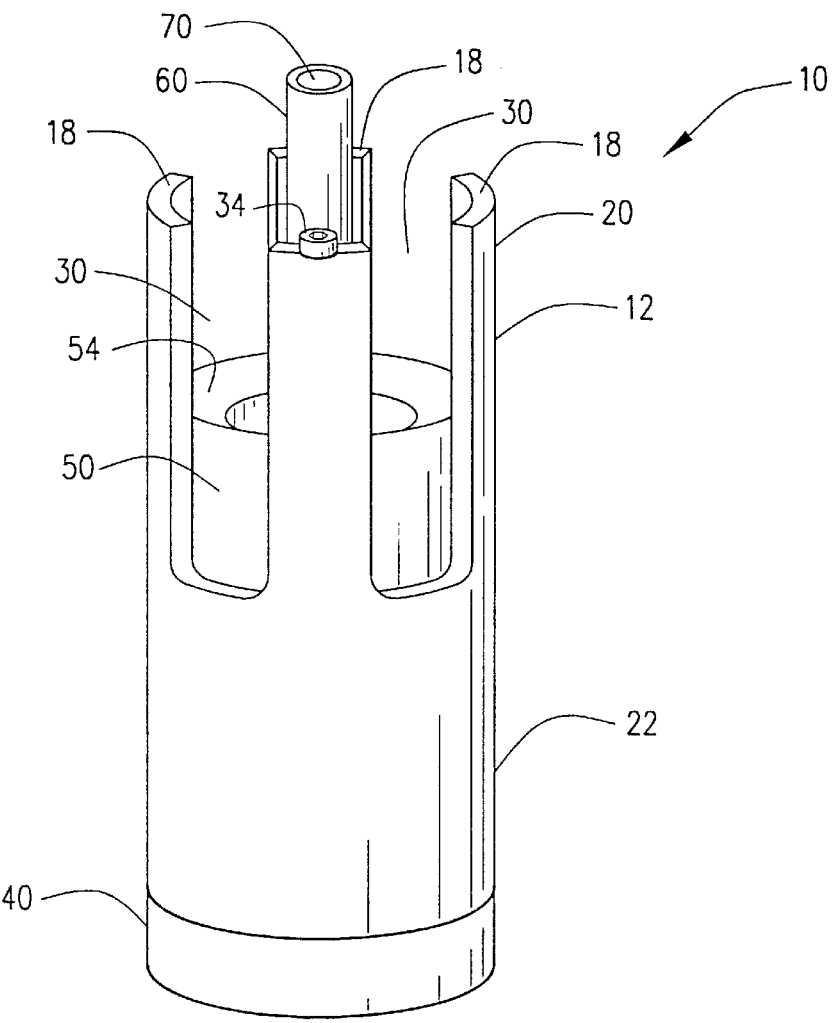
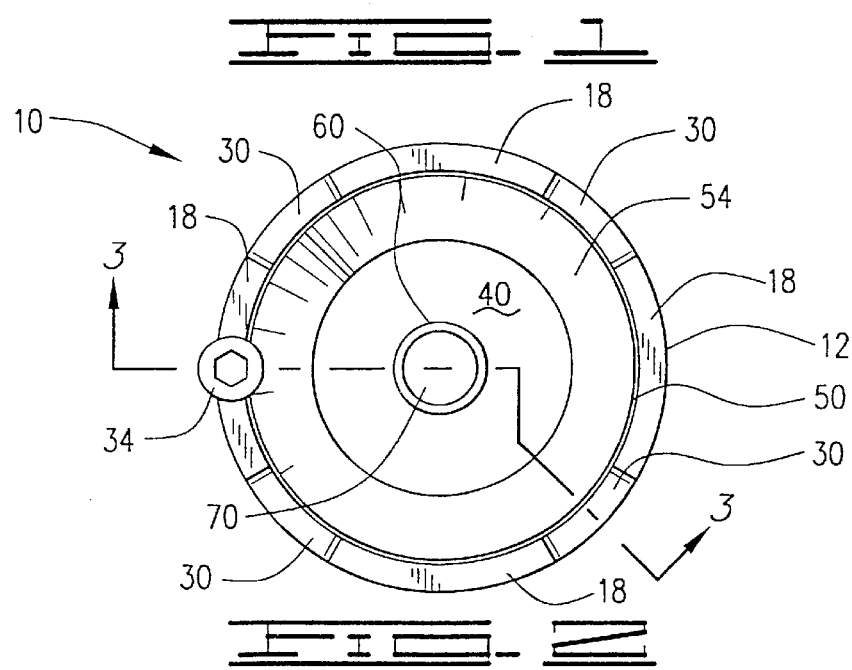

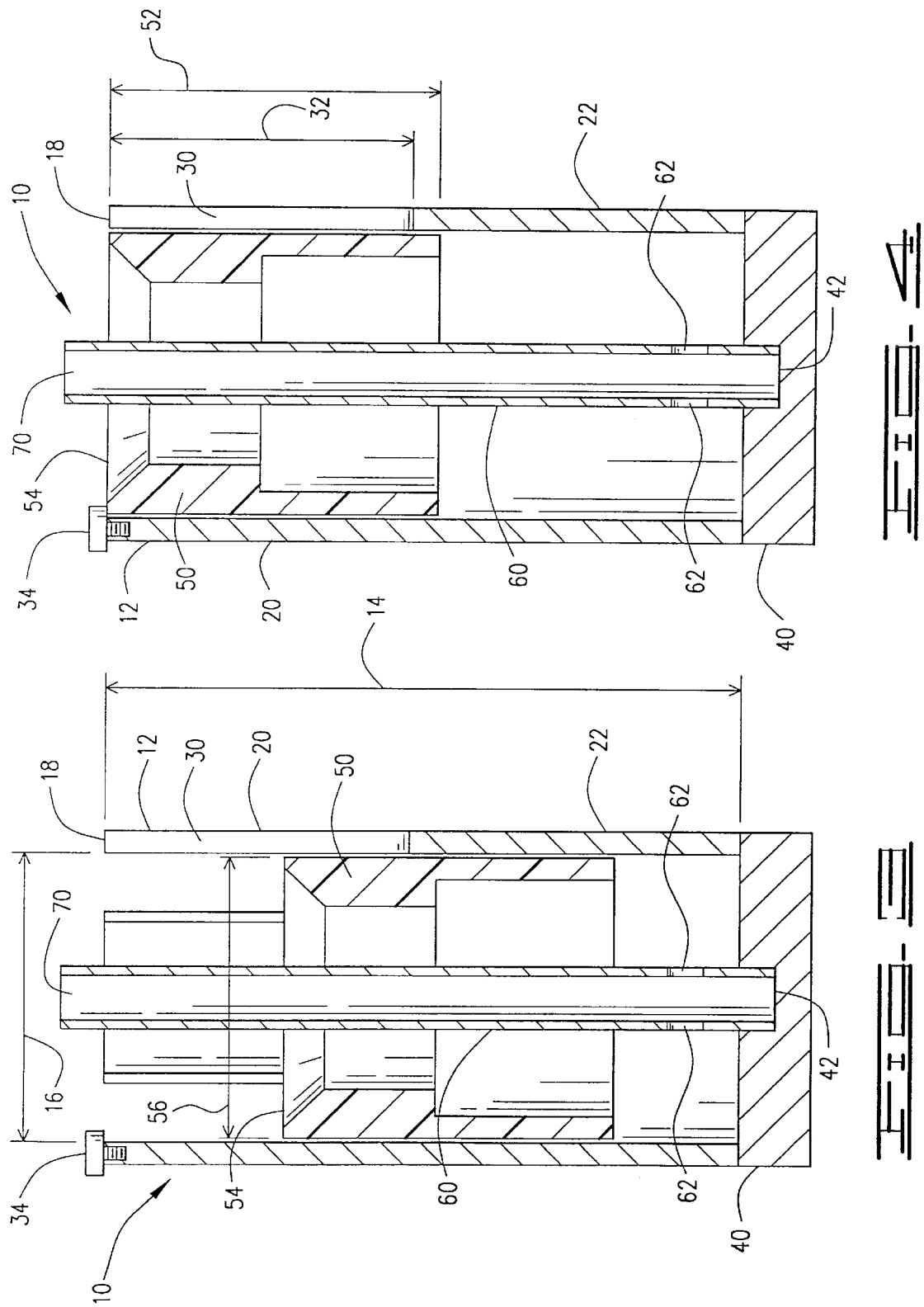

SKIMMER VALVE

CROSS-REFERENCE TO RELATED APPLICATIONS

None.

BACKGROUND OF INVENTION

1. Field of the Invention

The invention is a skimmer valve place in a body of liquid or within a system having liquid flow out of a reservoir to effectively skim a layered component fluid from the liquid mixture.

2. Description of Prior Art

In a search of prior art, the following patents were discovered. Several skimmers are located in prior art dealing with tramp oil, coolants or, generically, liquids of differing densities. Most are fairly large and involve multiple tanks and floats with either an electric or manually controlled mechanism. In contrast to the device of the invention which is unique in that it is relatively small and works on a buoyant float mechanism.

In U.S. Pat. Nos. 5,814,213 and 5,601,705, both to Glasgow, surface skimming devices are disclosed which are utilized within a tank having a pump which pumps the skimmed liquid into a second tank, where coalescence occurs, for separation and collection of the lower density material and then returns the separated liquid to a tank. The first patent also concerns an external float which allows the skimmer to remain on the surface of the liquid mixture. In U.S. Pat. No. 5,454,937 to Lewandowski, a multiple tank and compartment skimming apparatus is disclosed which is used in coolant liquid separation. U.S. Pat. No. 5,104,529 to Becker discloses a coolant recycling apparatus having multiple storage tanks mounted on a wheeled cart for a coolant which is filtered for solids through filters and returned to the coolant containing device from which the coolant was removed. A complex electronically activated and computer controlled radiator coolant cleaning and refining device is disclosed in U.S. Pat. No. 5,094,757 to Light. A vacuum operated dry sump system used in filtering a hydraulic circuit. having a heat exchanging component is disclosed in U.S. Pat. No. 5,101,936 to Paredes.

None of these invention, nor other inventions disclosed in prior art appear to disclose the elements contained in this current invention which is a simple skimming filter using a buoyant float skimming apparatus which requires no outside power source or sophisticated monitoring system.

SUMMARY OF THE INVENTION

The invention is a perpetual skimming device for insertion into a reservoir containing liquid at the liquid level which allows the top liquid layer to enter an outer cylinder of the device through longitudinal slots, raising a floating inner cylindrical portion, which in turn, shuts off the liquid entry once enough liquid has entered the device to raise the float to cut off the liquid intrusion. The liquid is then removed by a centrally affixed pickup tube having fluid entry ports at the bottom of the tube, located near the base of the outer cylinder. As the liquid is removed, the inner cylindrical float lowers and allows more liquid into the cylinder, for a perpetual cyclic skimming operation.

DESCRIPTION OF THE DRAWINGS

The following figures are submitted with this utility patent application.

FIG. 1 is a side view of the invention.

FIG. 2 is a top view of the invention.

FIG. 3 is a cross-section of the invention, with the inner cylinder float in a lowered position.

FIG. 4 is a cross-section of the invention, with the inner cylinder float in a raised position.

DESCRIPTION OF THE PREFERRED EMBODIMENT

The invention, as shown in FIGS. 1–4 of the drawings, is a skimmer valve 10 comprising a hollow outer cylinder 12 having a length 14, an inner diameter 16 and having a top rim 18, an upper portion 20 and a lower portion 22. As shown in FIG. 1, several longitudinal slots 30 of a length 32 less than half the length 14 of the outer cylinder 12 are provided in the upper portion 20 of the outer cylinder 12, the slots 30 originating from the top rim 18. A base 40 is affixed to the lower portion 22 of the outer cylinder 12. A hollow inner cylindrical float 50 made of a buoyant, liquid resisting material is contained within the outer cylinder 12. The inner cylindrical float 50 has a length 52 of greater than half the length 14 of the outer cylinder 12, an upper lip 54 and an outer diameter 56. The outer diameter 56 of the inner cylindrical float 50 is less than the inner diameter 16 of the outer cylinder 12 enabling it to float freely within the outer cylinder 12, yet enough in outer diameter 56 to reduce liquid flow between the outer cylinder 12 and the inner cylindrical float 50. A removable retaining screw 34 is affixed at the top rim 18 of the outer cylinder 12 to prevent the inner cylindrical float 50 from floating completely out of the outer cylinder 12 by blocking a portion of the inner diameter 16 of the outer cylinder 12 at the top rim 18.

As shown in FIGS. 2–4, in a first embodiment of the invention, a pickup tube 60 is attached at a central point 42 of the base 40 of the outer cylinder 12. The pickup tube 60 extends upward inside the hollow of the inner cylindrical float 50, the pickup tube 60 having openings 62 slightly above its attachment to the base 40, through which liquid is drawn from the lower portion 22 of the outer cylinder 12 to be removed from the inside of the cylinder to another location by some externally provided pumping means 70.

When the cylinder is positioned within a reservoir at the liquid level, the upper liquid level will enter the cylinder flowing over the upper lip 54 of the inner cylindrical float 50 into the outer cylinder 12 through the longitudinal slots 30. As the liquid level rises, so does the inner cylindrical float 50. The float 50, upon rising to a certain elevated level, acts as a barrier, prohibiting further liquid introduction into the cylinder at that point, by forming a wall behind the longitudinal slots 30. The contained liquid within the cylinder is then drawn up the pickup tube 60 through the openings 62 of the pickup tube 60. As the contained liquid is drawn out of the cylinder by some external pumping means 70, the inner cylindrical float 50 lowers, thus again opening the longitudinal slots 30 and allowing liquid to enter the cylinder again, repeating such process in a perpetual cycle.

In a second embodiment, the hollow pickup tube 60 is inserted through the central point 42 of the base 40 of the outer cylinder 12, still having the plurality of openings 62 in the pickup tube 60 located within the outer cylinder 12, but the pickup tube 60 extends downwards from the base 40 of the outer cylinder 12 instead of extending upward through the valve 10, but the pickup tube 40 is still connected to the external pumping means 70 and the liquid contained within the outer cylinder 12 is still removed from the lower portion 22 of the outer cylinder 12, the valve functioning virtually identically to its function in the first embodiment in perpetual cycle.

While the invention has been particularly shown and described with reference to a preferred embodiment thereof, it will be understood by those skilled in the art that changes in form and detail may be made therein without departing from the spirit and scope of the invention.

What is claimed is:

1. A skimmer valve for placement in a liquid containing reservoir at or near the liquid level, comprising:
   a. a hollow outer cylinder having a length, an inner diameter, a top rim, an upper portion and a lower portion;
   b. a base attached to the lower portion of the outer cylinder, the base having a central point;
   c. longitudinal slots in the upper portion of the outer cylinder originating from the top rim, the slots having a longitudinal length of slightly less than one half the length of the outer cylinder;
   d. a hollow inner cylindrical float within the outer cylinder having an upper lip, made of a liquid resisting buoyant material, the cylindrical float having a length and an outer diameter, the length slightly greater than one half the length of the outer cylinder and the outer diameter slightly less than the inner diameter of the outer cylinder;
   e. a retaining screw removably attached to the top rim of the outer cylinder which is large enough to constrict the inner diameter of the outer cylinder preventing the inner cylindrical float from extending beyond the top rim of the outer cylinder;
   f. a hollow pickup tube affixed to the base at the central point, extending upward through the hollow inner cylindrical float, the pickup tube having a plurality of openings slightly above its affixation to the base, through which liquid may drawn from the lower portion of the outer cylinder; and;
   g. an external pumping means attached to the hollow pickup tube to withdraw liquid through the tube, wherein an upper liquid level within the reservoir is allowed to enter the longitudinal slots, pass over the upper lip of the inner cylindrical float, causing the inner cylindrical float to elevate with the rising liquid, cut off the flow of the liquid at some point, restricting further fluid flow into the cylinder, until the external pumping means draws the contained liquid from the lower portion of the outer cylinder through the openings of the pickup tube, reducing the liquid level, lowering the inner cylindrical float, and allowing liquid to again enter the longitudinal slots, this cyclic pattern of skimming liquid repeating in a cycle of perpetuity.

2. The invention as described in claim 1, wherein: the hollow tube is inserted through the central point of the base attached to the outer cylinder and extends through the base attached to the outer cylinder.

\* \* \* \* \*